(12) United States Patent
Magers et al.

(10) Patent No.: US 7,398,682 B2
(45) Date of Patent: Jul. 15, 2008

(54) LOW FLUID LEVEL DETECTOR SYSTEM

(75) Inventors: Michael Magers, Encinitas, CA (US); Adib Gabrail Daoud, San Diego, CA (US); Mark D. Wieczorek, San Diego, CA (US)

(73) Assignee: Innercool Therapies, Inc., San Diego, CA (US)

( * ) Notice: Subject to any disclaimer, the term of this patent is extended or adjusted under 35 U.S.C. 154(b) by 0 days.

(21) Appl. No.: 10/992,924

(22) Filed: Nov. 18, 2004

(65) Prior Publication Data
US 2005/0155427 A1 Jul. 21, 2005

Related U.S. Application Data

(60) Provisional application No. 60/523,432, filed on Nov. 18, 2003.

(51) Int. Cl.
*G01F 23/72* (2006.01)
(52) U.S. Cl. .......................................... 73/313; 73/319
(58) Field of Classification Search .................. 73/313, 73/319
See application file for complete search history.

(56) References Cited

U.S. PATENT DOCUMENTS

| | | | |
|---|---|---|---|
| 4,165,935 A | 8/1979 | Bongort et al. | |
| 4,483,193 A | 11/1984 | Bonetti | |
| 4,499,348 A | 2/1985 | Gismervik et al. | |
| 4,870,862 A | 10/1989 | Bonetti | |
| 4,959,997 A | 10/1990 | Aisa et al. | |
| 5,020,367 A | 6/1991 | White | |
| 5,294,917 A | 3/1994 | Wilkins | |
| 5,829,303 A | 11/1998 | Fraser | |
| 6,253,611 B1 | 7/2001 | Varga et al. | |
| 6,481,278 B1 * | 11/2002 | Kaylor et al. | 73/313 |
| 6,813,946 B1 * | 11/2004 | Benton | 73/309 |
| 2002/0005715 A1 * | 1/2002 | Sato | 324/207.2 |

* cited by examiner

*Primary Examiner*—Hezron E. Williams
*Assistant Examiner*—Paul M West
(74) *Attorney, Agent, or Firm*—Mayer & Williams PC; Mark D. Wieczorek, Esq.; Karin L. Williams, Esq.

(57) ABSTRACT

A fluid level detector system, which may measure the amount of fluid in a reservoir, and may further trigger an alarm when the fluid level in the cassette reaches a low level condition. The cassette's reservoir may contain a transient sterile solution, which is moving through the cassette to be either cooled or heated in the heat exchanger area. The detection scheme includes a ring magnet housed in a float assembly located in the fluid reservoir of the cassette and, e.g., two magnetic sensors, such as may form a Hall effect integrated circuit, which may be fixed within the console.

4 Claims, 6 Drawing Sheets

$$B = \frac{B_r}{2r_0 \left[ 2r_i \left[ \frac{d+\ell}{\sqrt{(d+\ell)^2 + r_0^2}} - \frac{d}{\sqrt{d^2 + r_0^2}} - \left( \frac{d+\ell}{\sqrt{(d+\ell)^2 + r_i^2}} - \frac{d}{\sqrt{d^2 + r_i^2}} \right) \right] \right]} \text{ gauss}$$

$d$ = INCHES $$\text{GAIN} = V_{TP5} \times \left(1 + \frac{R30}{R25}\right) \text{ RANGE x1 to x3}$$

LOW FLUID LEVEL DETECTOR SYSTEM

CONTINUING INFORMATION

This application claims priority benefit of U.S. Provisional Patent Application Ser. No. 60/523,432, filed Nov. 18, 2003, entitled "LOW FLUID LEVEL DETECTOR SYSTEM".

FIELD OF THE INVENTION

The invention relates to fluid level detection, and more particularly to fluid level detection in medical fluid cycling systems.

BACKGROUND OF THE INVENTION

In medical fluid cycling systems, such as consoles, it is important to know whether a leak has occurred. In the case where fluid is cycling into a catheter in a patient, it is particularly important to know such information so that a patient is not harmed by the introduction of such fluid.

Various ways of accomplishing leak detection have been tried, including the use of ultrasound, optical techniques, mechanical techniques, etc. These all suffer from one or more disadvantages. For example, mechanical techniques rely on mechanical switches which are prone to failure. Optical techniques are only useful if the reservoir whose level is to be determined can have an optically-polished window disposed through which to view the level.

There is a need for a more reliable indicator of fluid level.

SUMMARY OF THE INVENTION

An embodiment of the invention includes a fluid level detector system, which may measure the amount of fluid in a reservoir, and may further trigger an alarm when the fluid level in the cassette reaches a low level condition. The cassette's reservoir may contain a transient sterile solution, which is moving through the cassette to be either cooled or heated in the heat exchanger area. The detection scheme includes a ring magnet housed in a float assembly located in the fluid reservoir of the cassette and, e.g., two magnetic sensors, such as may form a Hall effect integrated circuit, which may be fixed within the console.

Advantages of the invention may include one or more of the following. Embodiments of the invention may allow a more precise determination of fluid level. Embodiments of the invention may allow a determination of the amount of fluid in a reservoir, not just whether the fluid level has reached one or more levels.

DETAILED DESCRIPTION

Generally, an embodiment of the invention includes a fluid level detector system, which may measure the amount of fluid in a reservoir, and may further trigger an alarm when the fluid level in the cassette reaches a low level condition. The cassette's reservoir may contain, e.g., approximately 100 ml of transient sterile solution, which is moving through the cassette to be either cooled or heated in the heat exchanger area. The detection scheme includes a ring magnet housed in a float assembly located in the fluid reservoir of the cassette and, e.g., two magnetic sensors, such as may form a Hall effect integrated circuit, separated by, e.g., 0.2 inches and which may be fixed within the console. The second Hall effect sensor provides a redundancy to the design; if the primary sensor fails, the secondary sensor may still provide safe operation and identification of a "low fluid alarm" condition.

The float moves up and down depending on the fluid level within the cassette's reservoir. This movement changes in a predictable and repeatable manner the magnetic flux density at the Hall effect sensors. The Hall effect sensor response can be calibrated for a precise measurement of distance between the magnet and the sensor to better than a 0.075 inch accuracy.

A sterile 250 ml IV bag, located a few inches above the cassette reservoir, is used to prime the system initially, and to add fluid during operation if needed, such as in the heating mode when the compliance of the system increases. Since the reservoir is kept full during normal operation by the return of the closed circulating sterile fluid, any leak of the system would initially draw fluid from the IV bag and if the leak continues, then the cassette's reservoir would lose volume until the fluid level detector would throw an alarm and turn the pump off. The user would then be instructed to look for leaks in the circulating set/catheter. Thus the console would alarm and shut down prior to any movement of air into the catheter and mitigate the possibility of air being pumped into the patient's blood stream during a catheter fault or leak.

Figure 1:
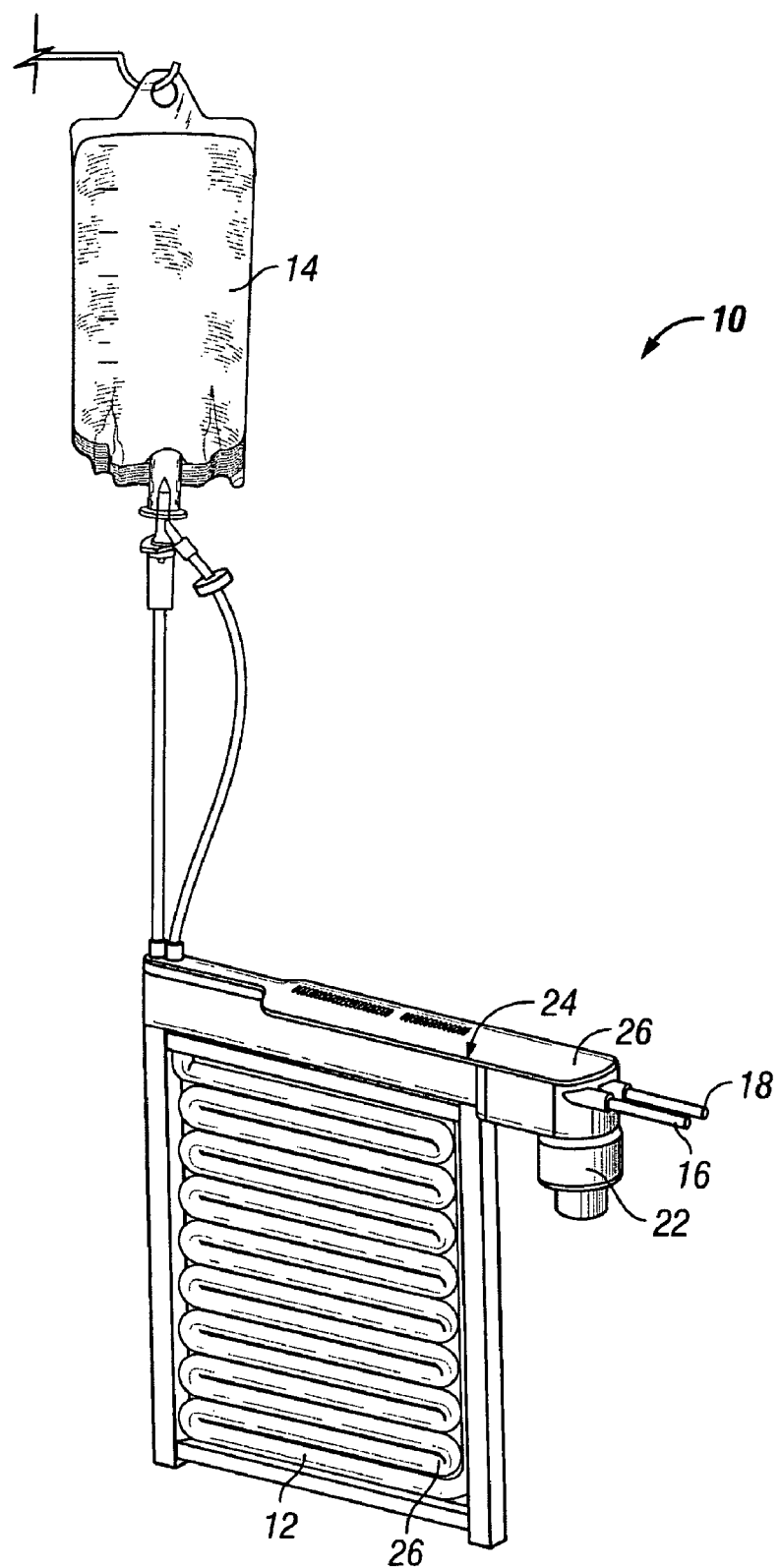
FIG. 1 shows an embodiment of a disposable cassette system according to an embodiment of the present invention.

More specifically, referring to FIG. 1, a disposable cassette system 10 is shown having an IV bag 14 that feeds into a bag 12 in which a serpentine fluid path 26 is employed. The bag 12 is heated on each side by two heat exchanger plates (not shown). Above the bag 12 is a reservoir 24 with a capping plate 26. Circulating the fluid is a pump 22, which expels fluid to the catheter via line 18 and accepts fluid from the catheter via line 16. A float containing a permanent ring magnetic is disposed within the reservoir, and the same rises and falls according to the fluid level. To maintain its orientation, a post is disposed substantially along the axis of the ring magnet, and the float and ring magnet ride up and down along the post.

Figures 2, 3:
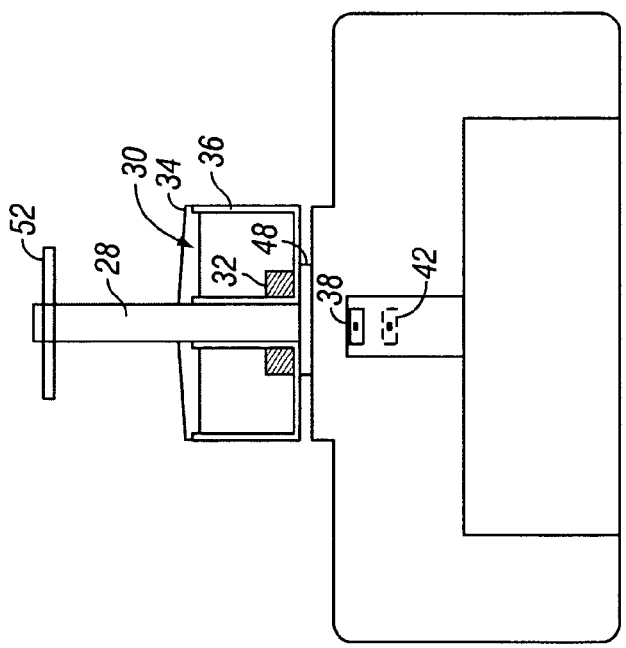
FIG. 2 shows a cross sectional design and relative location of a float with an integrated ring magnet according to an embodiment of the present invention.
FIG. 3 shows an equation predicting the magnetic flux density B, in gauss, as a function of distance away from the face of a ring magnet.

FIG. 2 shows a cross sectional design and relative location of a float 30, with an integrated ring magnet 32, and a dual Hall effect sensor board (shown by sensors 38 and 42). The centerline of the ring magnet 32, such as may be obtained from Dexter Magnetic Technologies of Elk Grove Village, Ill., may be maintained within an appropriate tolerance from the centerline of the Hall effect sensor. With the float at the bottom of its travel, the distance from the face of the ring magnet to the 'sweet spot' of the first Hall effect sensor may be predetermined. The stack up of tolerances on how the cassette seats in the console will determine the overall accuracy of the distance measurement and the precision of the fluid level alarm threshold. Stops 48 and 52 may be employed to prevent the float 30 from sticking at the ends of its travel.

Figure 4:
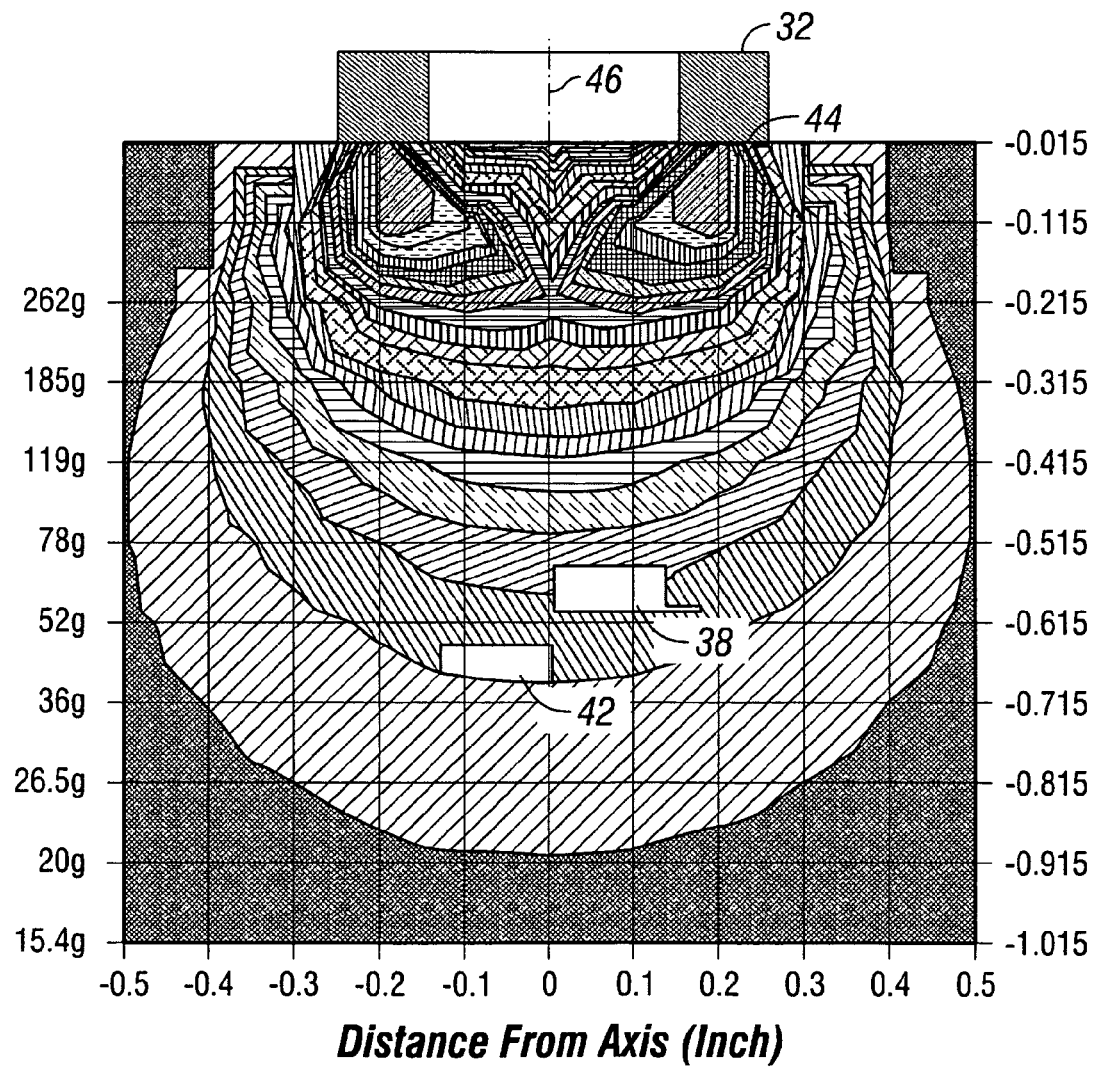
FIG. 4 shows a graphic depiction of the variation of field strength as a function of distance from the face and axis of a ring magnet.

The Hall effect sensors 38 and 42 may be mounted on a printed circuit board, and are available from Allegro Microsystems of Worcester, Mass. They are separated by a predetermined amount, and are aligned to the centerline of the ring magnet's flux. As the float assembly moves up or away from the sensors, the magnetic flux density is reduced. A known relationship (FIG. 3) may be employed to predict the magnetic flux density B, in gauss, as a function of distance away from the face of the ring magnet. FIG. 4 shows a graphic depiction of the variation of field strength as a function of distance from a face 44 and an axis 46 of a ring magnet.

For example, at a distance of 0.280 inches, the magnetic flux density is 211.5 gauss for a nearest primary sensor 38 and 89.5 gauss for a secondary sensor 42. At a distance of 0.558 inches, which may approximate the cassette's reservoir at 50% full, the primary sensor may sees a magnetic flux density of 65.0 gauss and the secondary sensor at 31.7 gauss.

Figure 5:
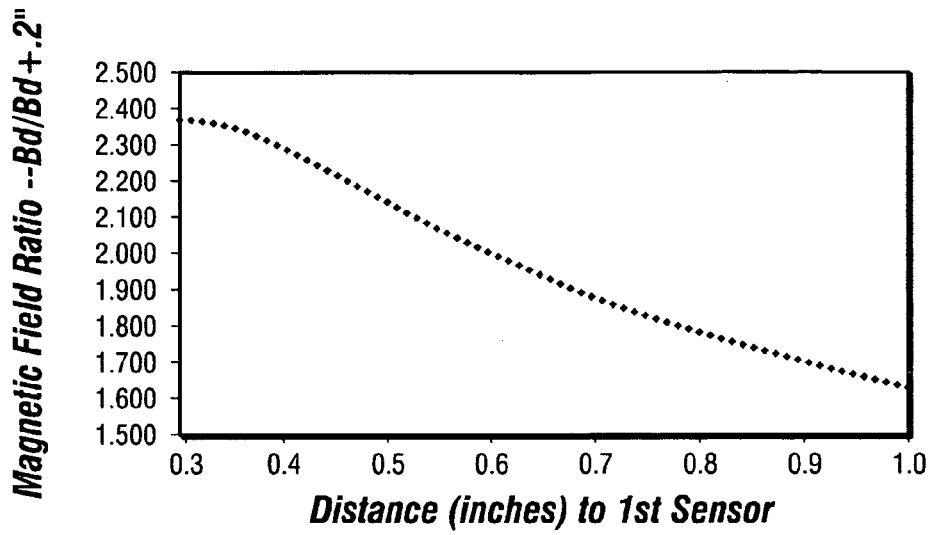
FIG. 5 shows the magnetic field strength vs. the distance from the ring magnet.

FIG. 5 shows the magnetic field strength vs. the distance from the ring magnet. The magnetic field strength increases as the distance decreases. Thus, in this example, the overall sensitivity for detecting a distance change increases significantly below a distance of about 0.6 inches. In other words, as the fluid level diminishes, the signal strength increases, which increases the detection distance sensitivity.

The electronics design employs a sensitive, temperature-stable linear Hall effect sensor. In one such sensor, with a stable 5.00+/−5% excitation power supply, the output sensitivity is 5 mv/gauss+/−10% with an initial offset of +/−15 gauss. The offset and gain sensitivity can be calibrated with the electronics to better than 1% gain, and +/−2 gauss offset. The sensor has an operating temperature range of −40 C to +85 C, and a typical temperature sensitivity of less than 0.05% per degree C. From 25 C ambient to 55 C (warming mode) the sensitivity change is less than 1.25%, and from 25 C to 0 C (cooling mode), the sensitivity change is less than 0.5%. A 1.25% change in sensitivity equals a distance ambiguity of approximately 0.004 inches at a distance of 0.558 inches (50% full).

Figure 6:
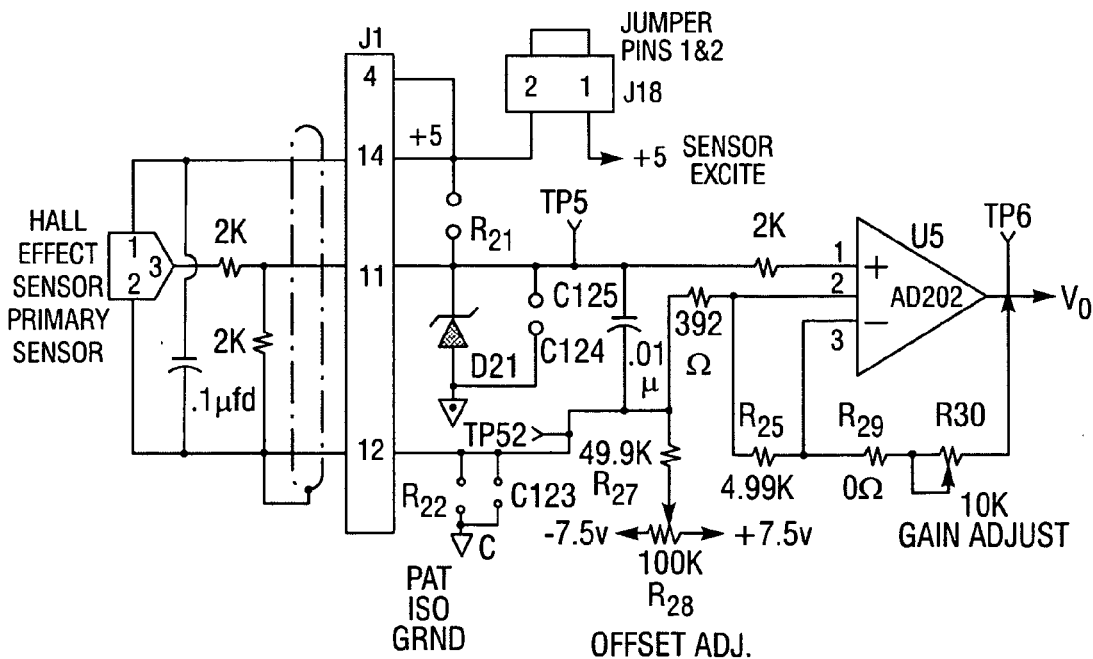
FIGS. 6 and 7 show a schematic and block diagram, respectively, of the signal processing of the Hall effect sensor electronics.
Figure 7:
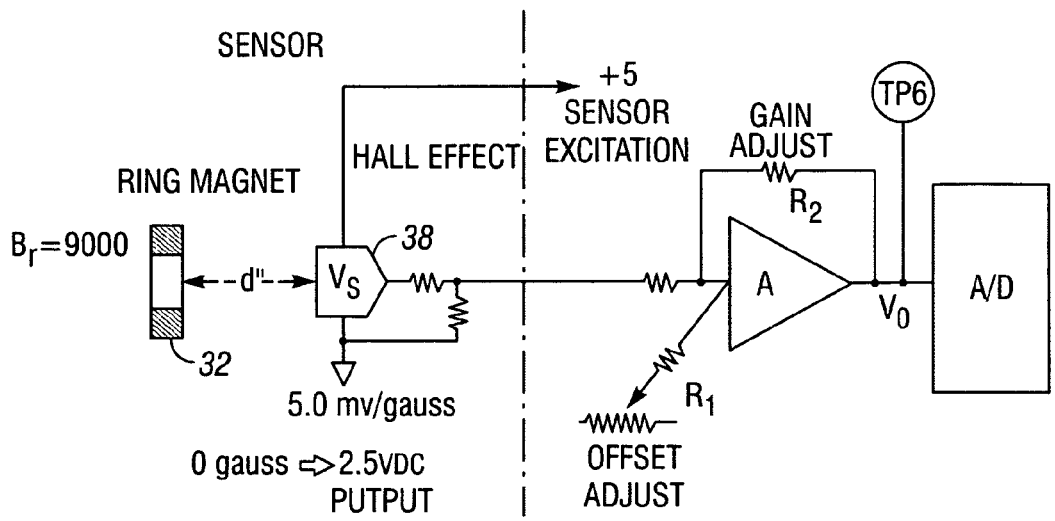
Figure 8:
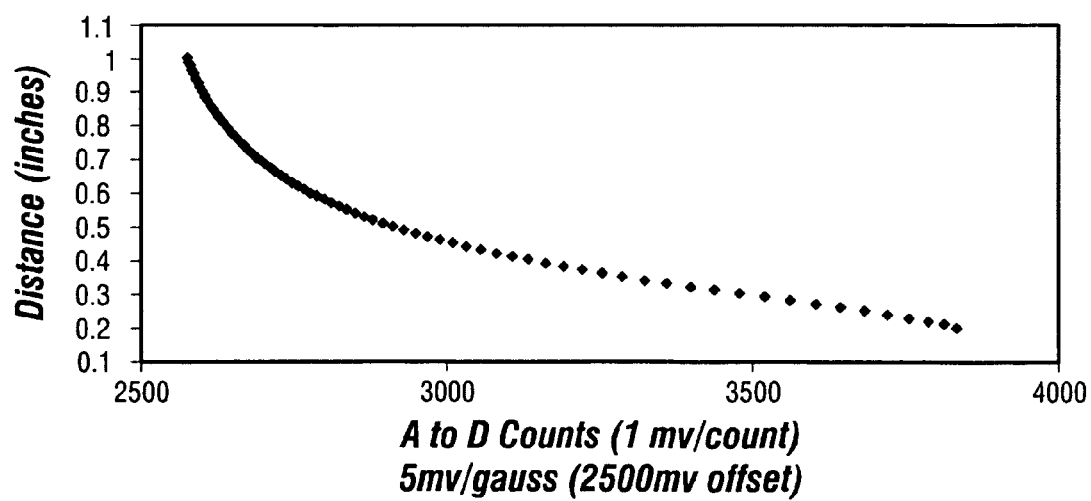
FIG. 8 shows the relationship between the A to D counts vs distance between the ring magnet and the primary Hall effect sensor.

FIGS. 6 and 7 show a schematic and block diagram, respectively, of the signal processing of the Hall effect sensor electronics. With the electronics calibrated appropriately, the 12 bit Analog-to-Digital converter (ADC) output provides a 1-bit equals 0.2-gauss resolution with an offset of 2500 bits for 0 gauss. In this configuration, the maximum signal that can be processed is approximately 300 gauss. With a minimum distance between the sensor and the ring magnet of 0.28 inches, the field strength of 211 gauss is within the capability of the ADC's 300 gauss. FIG. 8 shows the relationship between the A to D counts vs distance between the ring magnet and the primary Hall effect sensor.

Calibration of the electronics can be accomplished in the following manner:

Zero Offset Adjust:

1. Remove the cassette from the console, which creates a zero magnetic field strength condition.

2. Adjust the zero trim pot for an A to D reading of 2500+/−5 counts (+/−1 gauss zero setting) for both the primary and secondary sensor channels.

Gain/Sensitivity Adjust:

1. Install a calibration cassette into the console. The calibration cassette has a fixed float geometry such that the ring magnet is located at 0.558 inches from the Hall effect sensor, which simulates a 50% full reservoir.

2. Adjust the gain trim pot for an A to D reading of 2825+/−5 counts on the primary sensor channel and 2658+/−5 counts for the secondary sensor channel.

3. Remove the cassette and verify that the zero is maintained at 2500+/−5 counts, for both sensor channels, if not readjust zero trim pot.

4. Reinstall the calibration cassette, and verify the A to D count is 2825+/−5 counts, for the primary sensor channel, and 2658+/−5 counts for the secondary sensor channel, if not readjust gain trim pot.

5. Repeat steps 3 and 4 until the calibration A to D values are satisfied.

Fluid Level Detection Accuracy:

The expected accuracy of the fluid level measurement system may be calculated based upon the tolerances of the design. Table 2 summarizes the expected accuracy of the distance measurement of a magnetic float/Hall effect sensor at a distance of, e.g., 0.558 inches, which equates to a 50% full reservoir. For example, the magnet's size variation could translate into a distance inaccuracy of +/−0.020 inches, whereas the magnetization level variation of +/−5% could have a distance inaccuracy of +/−0.032 inches. Other parameters, such as the float weight, electronics calibration tolerance, etc. are also defined for their distance inaccuracy impact. This analysis assumes that all of the variability from each potential error source are independent of each other, and follow a normal distribution.

With these assumptions, the Root Sum Square (RSS) Analysis (taking the square root of the sum of variances squared for each error term) can provide an expected range of inaccuracy which is about half of the worst-case error, if all variances were just added together. It would be highly unlikely that all variances would exist in the extreme to create the worst-case scenario. The mechanical seating tolerance was not included in the RSS analysis, but was added to the RSS inaccuracy number since it is a larger number, 0.031 inches.

The analysis concludes that the expected inaccuracy, as defined by the RSS method of variance analysis, is approximately +/−0.075 inches for +/−3 standard deviations. One system goal for the distance inaccuracy may be to resolve the location of the ring magnet location to within +/−0.10 inch, which would thus be satisfied. In any case, the fluid level can thus be resolved, in a linear fashion, for the range of movement of the float, not just over one or two predetermined threshold levels.

Software Fluid Level Algorithm

One goal of the fluid level detector may be to sense when the fluid level in the reservoir is being depleted past a threshold level; e.g. 60% full. The ambiguity of determining this exemplary 60% full threshold can be in the range of 54% to 66% full because of the +/−0.075" distance inaccuracy. With a pump flow rate of less than 8 cc's per second, and 54 cc's remaining in the 100 cc reservoir, the response time (latency time) of the system may have to be less than 6.8 seconds or otherwise air could advance towards the catheter from the cassette. With this understanding, the A to D counts can be filtered and averaged in software using a 2-second time constant single pole filter (3 time constants would have a 95% step change response in 6 seconds).

A float containing the magnet as detailed in FIG. 2 may have a nominal buoyancy of, e.g., 0.285 inches. And at a fluid level of 60%, the magnet's distance from the primary Hall effect sensor would be 0.671 inches, resulting in a magnetic strength of 42.6 gauss and an A to D count of 2713.

Figure 9:
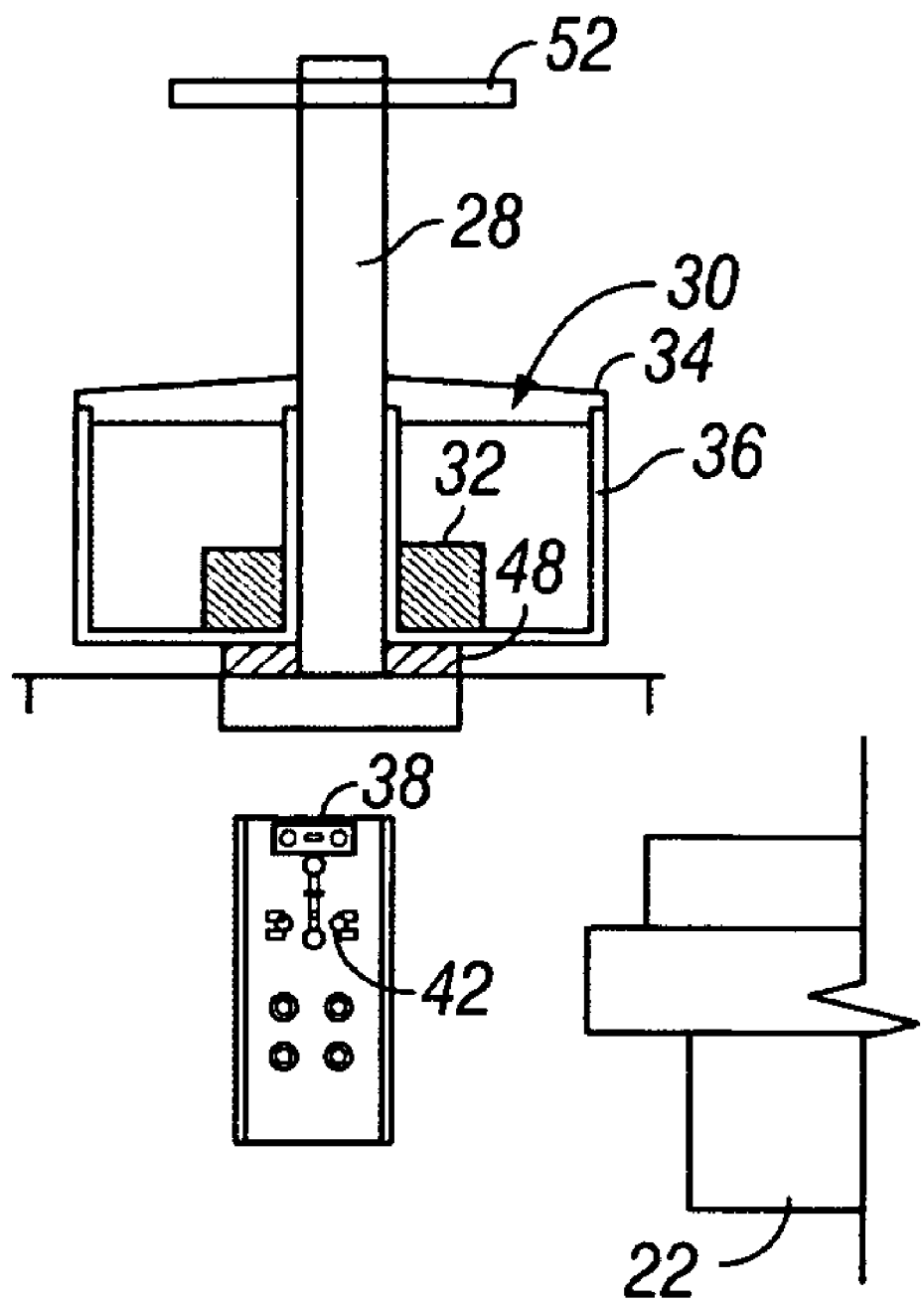
FIG. 9 shows the float location relative to the Hall effect sensors when the reservoir is empty of fluid.

FIG. 9 shows the float 30 location relative to the primary Hall effect sensor 38 when the reservoir is empty of fluid, in the example less than 28% full. The float has reached its minimum distance of travel, 0.280 inches, even though fluid still could remain in the reservoir, but insufficient height to buoy the float 30 off of the stop 48. Table 2 below summarizes the distances, fluid levels and A to D counts for the primary and secondary sensors for this location as well as for when the reservoir is at various other percentages full.

In addition to determination of a linear range of float and ring magnet locations, according to fluid level, the system can also employ software which performs a derivative of location with respect to time. In this way, the size of the leak can be determined. A large leak would have a large value of the derivative, and a small leak would have a small value. Instead of performing the derivative of location, e.g., just along a z-axis 46 (see FIG. 4), the width and length of the reservoir may be multiplied to the z-axis value to yield a derivative of volume with respect to time.

The alarm strategy may activate a "low fluid level alarm" condition with a primary sensor reading a fluid level of less than or equal to, e.g., 60% which equates to an A to D count greater than 2713 counts and/or when the secondary sensor senses a fluid level of 42% or less for an A to D count greater than 2713. If the primary sensor fails to initiate an alarm at the 60% threshold, and a leak continues to move the float 0.20 inches lower in the reservoir (a further loss of 18% of the reservoir capacity) to approximately 42%, then the secondary sensor would activate the "low fluid level alarm" and may stop the transport of fluid to the catheter. Thus the two sensor combination provides redundancy in activating a "low fluid level alarm" and prevents the reservoir from running empty and potentially moving air into the catheter—thus mitigating the potential of pumping air to a catheter during a catheter leak situation. Additional system mitigation may be employed, such as by using the pump motor speed loop to recognize the condition that the pump is pumping air rather than fluid (which may then throw an alarm condition).

The alarm strategy is summarized below:

| Sensor | Fluid Level % | A to D | Condition |
|---|---|---|---|
| Primary | less than 60% | >2713 | "low fluid level alarm" |
| Secondary | less than 42% | >2713 | "low fluid level alarm" |

The invention has been described with respect to certain embodiments. These embodiments should not be viewed as limiting of the invention. The invention may be practiced in a number of ways apart from the description above. Accordingly, the scope of the invention is limited only by the scope of the claims appended hereto, and equivalents thereof.

TABLE 2

| Fluid level % full | distance | Primary Sensor | | Secondary Sensor | |
|---|---|---|---|---|---|
| | | Magnetic strength | A to D counts | magnetic strength | A to D counts |
| <28% | 0.280" | 211.5 g | 3558 | 89.5 g | 2948 |
| 42% | 0.471 | 92.9 | 2965 | 42.6 | 2713 |
| 50% | 0.558" | 65.0 | 2825 | 31.7 | 2659 |
| 60% | 0.671" | 42.6 | 2713 | 22.3 | 2612 |
| >73% | 0.780" | 29.5 | 2648 | 16.4 | 2582 |

The invention claimed is:

1. A low fluid level detector, comprising:

a substantially annular float having a substantially hollow interior disposed in a reservoir containing a level of fluid;

a ring magnet disposed in the interior of the float, the ring magnet substantially co-axial with the float;

a primary Hall effect sensor disposed at a first distance from a face of the ring magnet, and a secondary Hall effect sensor disposed at a second distance from a face of the ring magnet, said second distance being greater than said first distance, both said primary Hall effect sensor and said secondary Hall effect sensor located outside of the reservoir, each of the primary and secondary Hall effect sensors for detecting the strength of the magnetic field caused by the ring magnet according to the first and second distances, respectively, such that the first distance between the face of the ring magnet and the primary Hall effect sensor is determined, and the second distance between the face of the ring magnet and the secondary Hall effect sensor is determined, and such that the level of fluid in the reservoir is determined based upon the first distance and the second distance.

2. The detector of claim 1, wherein the primary and secondary Hall effect sensors are aligned to the centerline of the ring magnet's flux.

3. The detector of claim 1, wherein the primary and secondary Hall effect sensors are mounted on a printed circuit board.

4. A method of determining the level of fluid in a reservoir, comprising:

measuring the distance between a ring magnet and a primary Hall effect sensor, and measuring the distance between the ring magnet and a secondary Hall effect sensor, the ring magnet disposed in a substantially hollow interior of a substantially annular float, the ring magnet substantially co-axial with the float, wherein the float is disposed in a reservoir containing a level of fluid, the measuring performed by the primary and secondary Hall effect sensors, the primary Hall effect sensor disposed a first distance from a face of the ring magnet, and the secondary sensor disposed a second distance from the face of the ring magnet, the second distance being greater than the first distance, both the primary Hall effect sensor and the secondary Hall effect sensor located outside of the reservoir, the primary and secondary Hall effect sensors for detecting the strength of the magnetic field caused by the ring magnet according to the first and second distances, respectively, such that the distance between the face of the ring magnet and the primary Hall effect is determined, and the distance between the face of the ring magnet and the secondary Hall effect sensor is determined, and such that the level of fluid in the reservoir is determined.

* * * * *